United States Patent
Zaman et al.

(10) Patent No.: US 8,074,181 B2
(45) Date of Patent: Dec. 6, 2011

(54) SCREEN MAGNIFIER PANNING MODEL WITH DYNAMICALLY RESIZABLE PANNING REGIONS

(75) Inventors: Nazia Zaman, Bellevue, WA (US); Paul J. Reid, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 443 days.

(21) Appl. No.: 12/210,226

(22) Filed: Sep. 15, 2008

(65) Prior Publication Data

US 2010/0070912 A1    Mar. 18, 2010

(51) Int. Cl.
*G06F 3/048* (2006.01)

(52) U.S. Cl. ........ 715/784; 345/660; 345/619; 345/665; 715/788; 715/865

(58) Field of Classification Search ........... 715/784, 715/788, 798, 800, 865; 345/660, 665, 619
See application file for complete search history.

(56) References Cited

U.S. PATENT DOCUMENTS

| | | | |
|---|---|---|---|
| 5,572,647 A * | 11/1996 | Blades | 715/798 |
| 5,586,196 A | 12/1996 | Sussman | |
| 5,781,195 A | 7/1998 | Marvin | |
| 6,023,275 A * | 2/2000 | Horvitz et al. | 715/700 |
| 6,396,487 B1 | 5/2002 | Jameson | |
| 6,587,119 B1 | 7/2003 | Anderson et al. | |
| 6,943,811 B2 | 9/2005 | Matthews | |
| 7,155,682 B2 * | 12/2006 | Rodden et al. | 715/788 |
| 7,274,377 B2 | 9/2007 | Ivashin et al. | |
| 7,369,102 B2 | 5/2008 | Luke et al. | |
| 2006/0026536 A1 * | 2/2006 | Hotelling et al. | 715/863 |
| 2007/0033543 A1 * | 2/2007 | Ngari et al. | 715/788 |
| 2008/0117313 A1 | 5/2008 | Voorhees | |
| 2008/0168402 A1 * | 7/2008 | Blumenberg | 715/863 |
| 2008/0222558 A1 * | 9/2008 | Cho et al. | 715/784 |

OTHER PUBLICATIONS

Moore, Scott, ZoomText 9.0 Users Guide, 2005, Algorithmic Implementations Inc., 224 pages, accessed via Internet at <http://www.bigshotmagnifier.com/docs/zt9/Z90_UserGuide_English_US_PDF.zip>.*

LunarPlus Enhanced Screen Magnifier version 8.0, Jun. 21, 2007, Dolphin Computer Access Inc., 257 pages, accessed via Internet at <http://www.yourdolphin.com/manuals/001PMANP801.pdf>.*

Macintosh OS X Universal Access: Built-in Accessibility for Student with Sensory Challenges (Cursor Size, Zoom, Display, and Flash Screen), Jun. 2008, 5 pages, accessed via Internet at <http://www.setbc.org/Download/learningcentre/access/MacOSAccessFeatures-SensoryTutorial.pdf>.*

Blenkhorn, et al,"Screen Magnifiers: Architecture, Evolution and Evaluation", IEEE Computer Society, Sep./Oct. 2003, pp. 54-61.

(Continued)

*Primary Examiner* — Kieu Vu
*Assistant Examiner* — James T Durkin
(74) *Attorney, Agent, or Firm* — Boswell IP Law; J. Mason Boswell (57) ABSTRACT

A magnifier panning system is described that creates a panning region at the edges of a magnified view. When a user moves the cursor into the panning region, the system pans the magnified view. When the user is not in the panning region, the user can interact with objects in the magnified view without the view shifting around. The objects appear magnified, but they do not behave or move any differently than they would if they were not magnified, providing the user with a familiar and comfortable user experience. Thus, the magnifier panning system provides the user with a much more natural view for interacting with the displayed objects while still allowing an efficient way to pan the view to move the magnified view to a different area of the screen.

20 Claims, 8 Drawing Sheets

OTHER PUBLICATIONS

You, et al, "A Usability Evaluation of Web Map Zoom and Pan Functions", Retrieved at<<http://www.ijdesign.org/ojs/index.php/IJDesign/article/view/31/11>>, vol. 1, No. 1 (2007), Published Mar. 30, 2007, pp. 1-14.

Buring, et al, "User Interaction with Scatterplots on Small Screens—A Comparative Evaluation of Geometric-Semantic Zoom and Fisheye Distortion", IEEE Transactions on Visualization and Computer Graphics, vol. 12, No. 5, Sep./Oct. 2006, pp. 829-836.

* cited by examiner

SCREEN MAGNIFIER PANNING MODEL WITH DYNAMICALLY RESIZABLE PANNING REGIONS

BACKGROUND

Accessibility and assistive technology is an area that is rapidly gathering momentum for users and in governments worldwide. In the United States, the American's with Disabilities Act (ADA) Section 508 and similar legislation in the European Union provide that government procurement officers choose the most accessible software when selecting from multiple options. Recent studies indicate that over 57% of computer users have some kind of impairment and vision impairments make up a significant chunk of that percentage. With the large aging baby boomer population, easy access to technology, and people remaining in the workforce longer and longer, low vision is becoming a growing problem. Providing a way for users to see things on the screen bigger and better is just one step towards addressing this issue.

Screen magnifiers are a type of assistive technology used by visually impaired people with some functional vision. By magnifying areas of the screen, the screen magnifier allows people that would otherwise not be able to see areas of the screen that are too small to enlarge these areas. Screen magnifiers are software applications that present a computer's graphical output in an enlarged form. Many screen magnifiers act similar to a physical magnifying glass that a user can move around over the screen to magnify a specific area, except rather than a physical object the screen magnifier is software and the user moves the displayed glass or lens with the mouse or other input device. The most common method of magnification is to present an enlarged view of a portion of the original screen content that covers a portion of or the entire screen. The enlarged view often tracks the pointer or cursor as the user moves a mouse or other input device around the screen so that the user can magnify different areas. Screen magnifiers may work with a single application or across multiple applications at the operating system level. For example, Microsoft Windows Vista includes a magnifier application for magnifying the entire desktop and any applications displayed on it.

Because the view is enlarged, screen magnifiers provide a way to move the lens, or magnified area, to different areas of the desktop or application. For example, at a magnification factor of 4 times (4x), only one-eighth of the desktop can be shown in a full screen magnifier at a time. Thus, to see the other three-fourths of the desktop a user moves the magnified area around in a process called panning. Although panning often refers only to horizontal movement (and scrolling or other terms refer to vertical movement), panning as used herein refers to movement of the magnified viewport in any direction, whether horizontally, vertically, or diagonally. There are several major existing methods of panning. In the first method, the magnified view is locked to the cursor. As the mouse or other input device moves, the cursor appears to stay centered in the magnified view and the magnified view moves to show different areas of the desktop or applications. In the second method, sometimes called static panning, the cursor moves within the magnified view, but when the cursor hits an edge of the view it "bumps" the view and moves it over a little in the direction the cursor was moving. In a third method, the cursor stays in the same relative position in the magnified view and moves in a scaled fashion as the user moves the input device. For example, as the user moves the magnified view to the upper-left of the screen, the cursor appears in the upper-left of the magnified view. The cursor moves slower within the magnified view than its actual movement over the screen (i.e., scaling) so that the cursor will reach the edge of the magnified view at the same time as the magnified view reaches the edge of the screen. Likewise, the cursor will reach the center of the screen at the same time as the magnified view is centered over the screen.

Implementations that follow the cursor continuously make it difficult for users to pay attention to the task at hand because the view is always shifting, often creating a feeling of motion sickness. For example, as the user moves the input device left, the view moves right. If the user is trying to perform a task, such as drawing a circle, this can become very disconcerting. Static panning implementations create a bad user experience because the cursor is stuck at the boundary of the panning region until the user pans all the way to an edge. Static panning implementations also generally require the user to repeatedly bump in the direction the user wants to go with no ability to control the speed of panning, and do not generally allow diagonal panning. The side of the magnified view that the user bumps (e.g., left, right, top, or bottom) determines the direction that the view pans. If the user wants to go diagonally to the upper-right, the user may have to repeatedly bump the mouse into different sides of the magnified view, creating a slow process of navigation and adding to the user's frustration.

SUMMARY

A magnifier panning system is described herein that creates a panning region at the edges of the magnified view that cause the magnified view to move when the cursor is within the region. The system moves the magnified view an amount based on the direction and velocity with which the cursor is moving, so that diagonal movement is possible and the user can control the speed of movement in a particular direction. When the cursor is not in the panning region, the view does not move so that the user can interact with the objects in the view normally. When the user wants to pan the magnified view, the user can easily do so by moving the cursor to an area at the edge of the magnified view that is within the panning region. Thus, the magnifier panning system provides the user with a much more natural view for interacting with the displayed objects while still allowing an efficient way to pan the view to a different area of the screen.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A magnifier panning system is described herein that creates a panning region at the edges of the magnified view that cause the magnified view to move when the cursor is within the region. For example, the panning region may be an invisible area at the edges of the magnified view having a size that is a small percentage of the total size of the magnified view. The system moves the magnified view an amount based on the direction and velocity with which the cursor is moving, so that diagonal movement is possible and the user can control the speed of movement in a particular direction. For example, if the user moves the mouse quickly to the upper right, then the system moves the magnified view diagonally to the upper right, and farther than if the user moved the mouse slowly. When the cursor is not in the panning region, the view does not move so that the user can interact with the objects in the view normally. For example, the objects appear magnified, but they do not behave or move any differently than they would if they were not magnified, providing the user with a familiar and comfortable user experience. When the user wants to pan the magnified view, the user can easily do so by moving the cursor to an area at the edge of the magnified view that is within the panning region. For example, the panning region may encompass 10% of the dimensions of the magnified view around each edge. Thus, the magnifier panning system provides the user with a much more natural view for interacting with the displayed objects while still allowing an efficient way to pan the view to move the magnified view to a different area of the screen.

Figure 1:
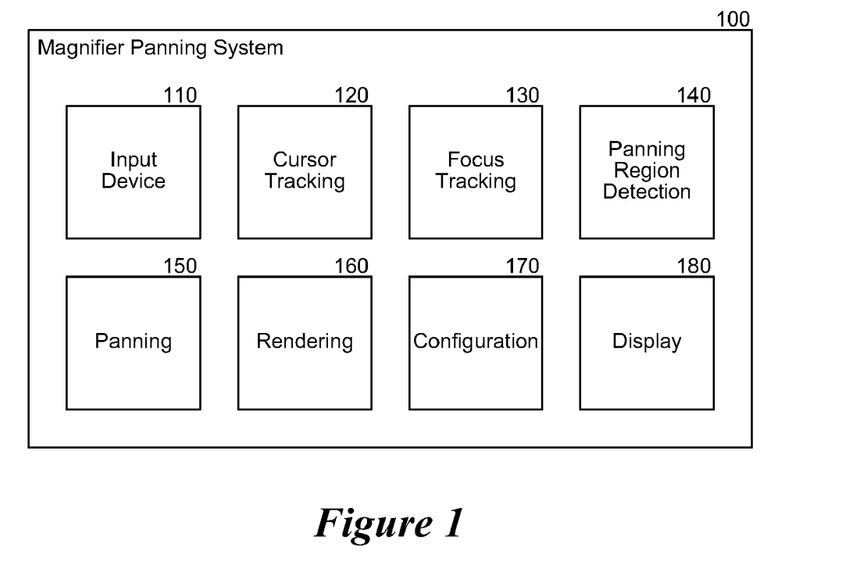
FIG. 1 is a block diagram that illustrates components of the magnifier panning system, in one embodiment.

FIG. 1 is a block diagram that illustrates components of the magnifier panning system, in one embodiment. The magnifier panning system 100 includes an input device 110, a cursor tracking component 120, a focus tracking component 130, a panning region detecting component 140, a panning component 150, a rendering component 160, a configuration component 170, and a display 180. Each of these components is described in further detail herein.

The input device 110 receives input from a user and communicates the input to an operating system. The input device can include a variety of devices such as a stylus, digital pen, mouse, or even the user's finger moving over a touch screen.

The cursor tracking component 120 tracks the movement of the cursor around the screen. As the user moves the input device 110, the cursor moves, which leads to the system 100 updating the magnified view and potentially panning the magnified view to include a new area of the screen. The cursor tracking component 120 provides the coordinates of the cursor used for performing these and other functions. In some modes, the magnifier panning system 100 pans the magnified view to follow the cursor.

The focus tracking component 130 tracks the focus of the user's actions between applications and the operating system. For example, if the user opens a menu, switches application windows, and so forth, the focus changes and the focus tracking component 130 keeps track of where the focus is currently. In some modes, the magnifier panning system 100 pans the magnified view to show the item that currently has the focus.

The panning region detecting component 140 detects when the cursor enters or is within the panning region. For example, if the user moves the cursor from the center to an edge of the magnified view, then the cursor will likely enter the panning region. When the cursor is in the panning region, the magnifier panning system 100 pans the magnified view to a new location.

The panning component 150 moves the magnified view to a new location. The panning component 150 may gather information from other components about the current location of the cursor, the current item of focus, and the historical position of the cursor to determine the direction and magnitude to move the magnified view. The panning component 150 may also accelerate and decelerate any movement as described herein.

The rendering component 160 receives input about what is on the screen and renders a portion of the screen at a larger size in the magnified view. The rendering component 160 may receive the screen information as a bitmap and use a stretch blit or other common graphical techniques to produce the magnified view. The rendering component may offload the work of producing the magnified image to operating components, such as the Desktop Window Manager (DWM) of Microsoft Windows Vista, when they are available. In some contexts (e.g., during logon) such components may not be available and the rendering component 160 produces the magnified view.

The configuration component 170 receives configuration information from the user. For example, the user may be able to configure the level of magnification, whether the magnifier panning system 100 tracks items of focus, and so on.

The display device 180 displays the contents of the screen and the magnified view. The magnified view may be a window that appears on a desktop provided by the operating system or over other windows (lens mode) or may take up the entire screen (full-screen mode) so that the user can only see a portion of the screen at a time. The display device 180 may be a traditional CRT or LCD monitor, a touch screen, or other suitable device.

The computing device on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
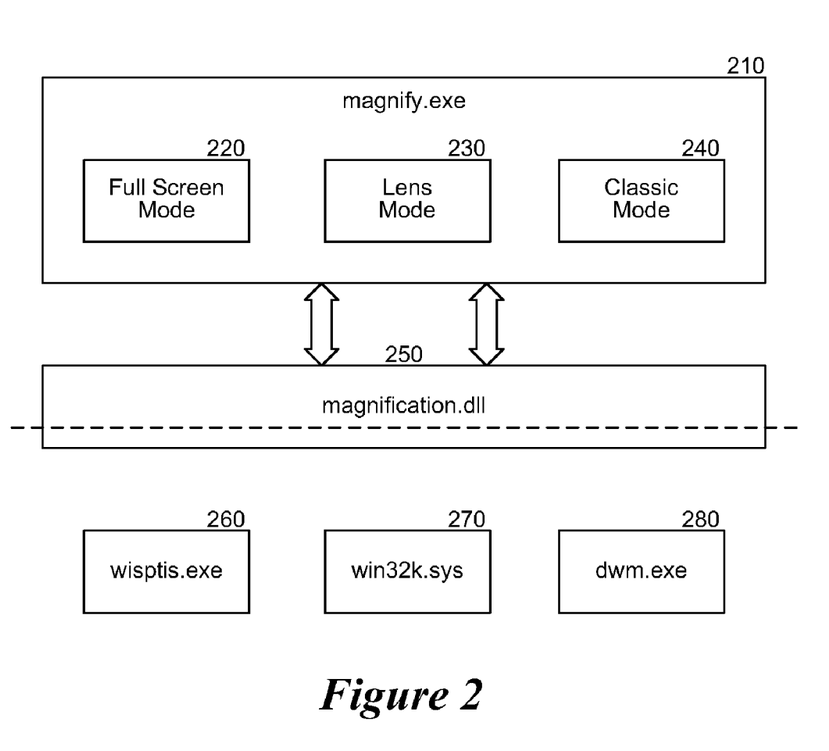
FIG. 2 is a block diagram that illustrates a Microsoft Windows-based operating environment of the magnifier panning system, in one embodiment.

FIG. 2 is a block diagram that illustrates a Microsoft Windows-based operating environment of the magnifier panning system, in one embodiment. The system includes an executable file 210, a supporting dynamic-link library 250, and 3 modules provided by the operating system, wisptis.exe 260, win32k.sys 270, and dwm.exe 280. The executable file 210, called magnify.exe, creates the process that controls the user interface and provides the end-to-end user experience. The magnifier.exe process controls the magnification, keeps track of input events, and moves the magnified view accordingly. The executable file 210 may provide 3 modes, full-screen mode 220, lens mode 230, and legacy mode 240. The full-screen mode 220 projects a magnified version of the user's desktop on the display device. One can envision it like a huge magnifier lens that covers the entire display. The lens mode 230 displays a magnified view of the desktop in a window that is smaller than the size of the display. This mode acts more like a traditional physical magnifying glass. The legacy mode 240 provides magnification with reduced functionality, such as when certain operating system services (e.g., dwm.exe) are not available. For example, during logon Microsoft Windows does not provide applications access to certain services.

The dynamic-link library 250, magnification.dll, provides an application-programming interface (API) exposed to internal and external magnification controllers. The executable file 210 magnify.exe and other applications call this API to request various magnification services. The dynamic-link library 250 acts as a proxy between the magnification controller, the kernel-mode state for the magnification context, and the desktop compositor.

Win32k.sys 270 is a kernel-mode driver that handles the bulk of the Win32K API on Microsoft Windows. Win32k.sys 270 includes a Raw Input Thread (RIT) that handles input processing for the magnifier panning system. Win32k.sys 270 also handles security and context control. Dwm.exe 280 provides the DWM process that keeps track of application and other windows. Dwm.exe 280 handles the output compositing and magnification for the magnifier panning system. Wisptis.exe 260 is responsible for input to a tablet via a stylus or touch and consumes input transformation functions provided by Win32K.sys 270 to transform absolute clicking to work in magnified contexts (e.g., what you see is what you click).

Figure 3:
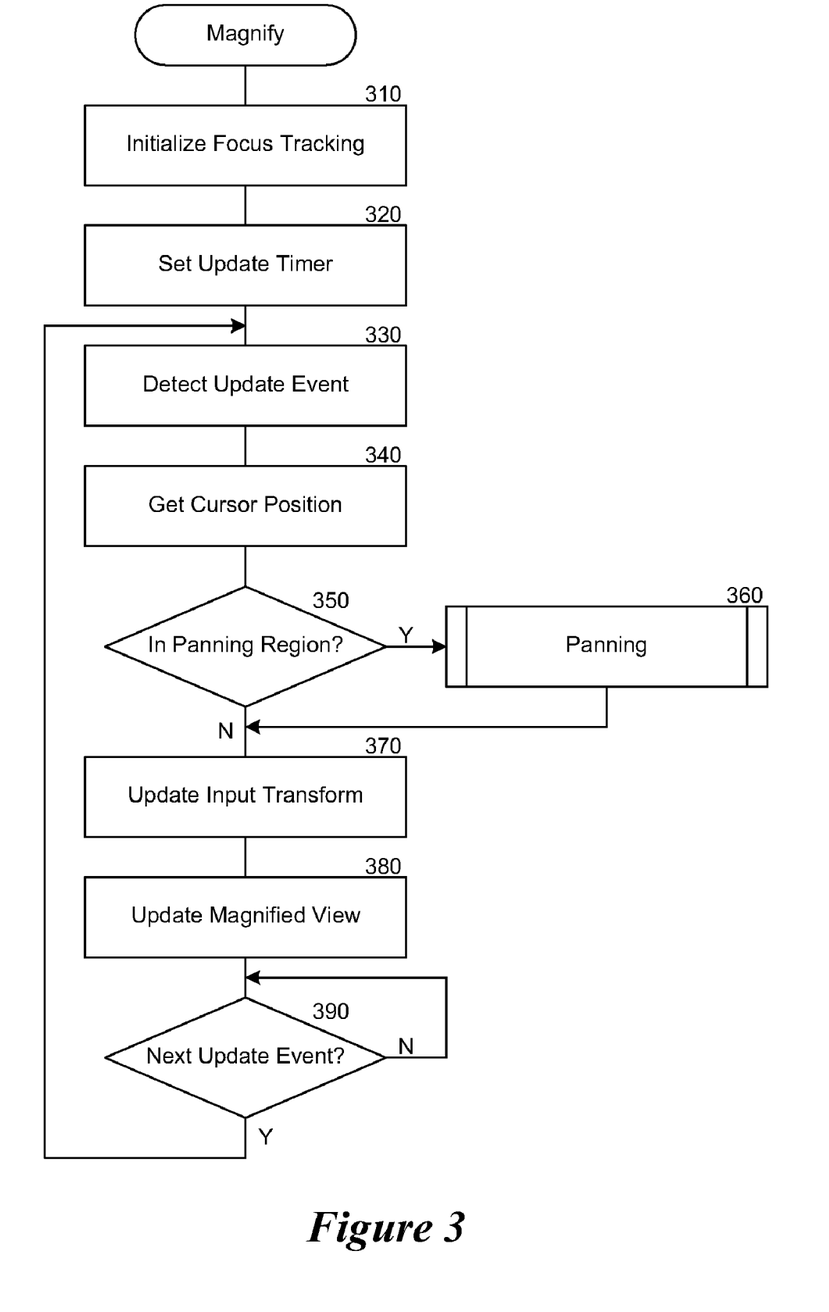
FIG. 3 is a flow diagram that illustrates the processing of the system to magnify an area of the screen, in one embodiment.

FIG. 3 is a flow diagram that illustrates the processing of the system to magnify an area of the screen, in one embodiment. In block 310, the system initializes focus tracking so that the magnified view can follow the focus if desired by the user. For example, the user may want the system to magnify whatever user interface elements (e.g., menu's buttons and so on) have the focus at any given time. In block 320, the system starts an update timer that fires to kick off an update of the position and contents of the magnified view. For example, the update timer may fire every 15 ms and modify the magnified view based on actions initiated by the user in since the last update. This step is optional and may not occur if the system is operating based on events rather than a timer. For example, for mouse movements the system can use a low-level mouse hook to detect mouse events. For focus tracking the system can use WinEvents (e.g., via SetWinEventHook) or other methods. In block 330, the system detects an update event, such as expiration of the timer described or in some cases, updates may be triggered by user action. For example, the system may receive a notification that the timer has fired. In block 340, the system retrieves the current cursor position. For example, the system may call an operating system API (e.g., GetCursorPos) to retrieve the location of the cursor.

In decision block 350, the system determines whether the current cursor position lies within the panning region. For example, if the user has moved the mouse to position the cursor near the edge of the screen, the cursor may have entered the panning region. If the cursor is in the panning region, the system continues at block 360, else the system continues at block 370. In block 360, the system pans the magnified view as described further with reference to FIG. 4. In block 370, the system updates the input transform. For example, the system may retrieve the contents of the screen that the magnified view is to magnify. In block 380, the system updates the magnified view. For example, the system may keep the magnified view in the right place and at the right zoom level. In decision block 390, the system determines if the next update interval has started based on the update timer. If it is time for the next update interval, the system loops to block 330, to handle the next update, else the system waits for the update time.

In some embodiments, the system moves the cursor to keep it within the magnified view. For example, when the system receives an event that would move the magnified area completely away from the cursor position, such as a focus tracking event, the system moves the cursor so it is still in the magnified view. This way, if the user moves the mouse it is already in the viewport and the system does not jump back and forth between keyboard focus location and mouse location. Whenever there is a non cursor event, the system will make sure the cursor is in the same relative position in the magnified view as it is on the physical desktop. For example, if the mouse is in the upper right of the physical desktop it will appear in the upper right of the magnified view.

Figure 4:
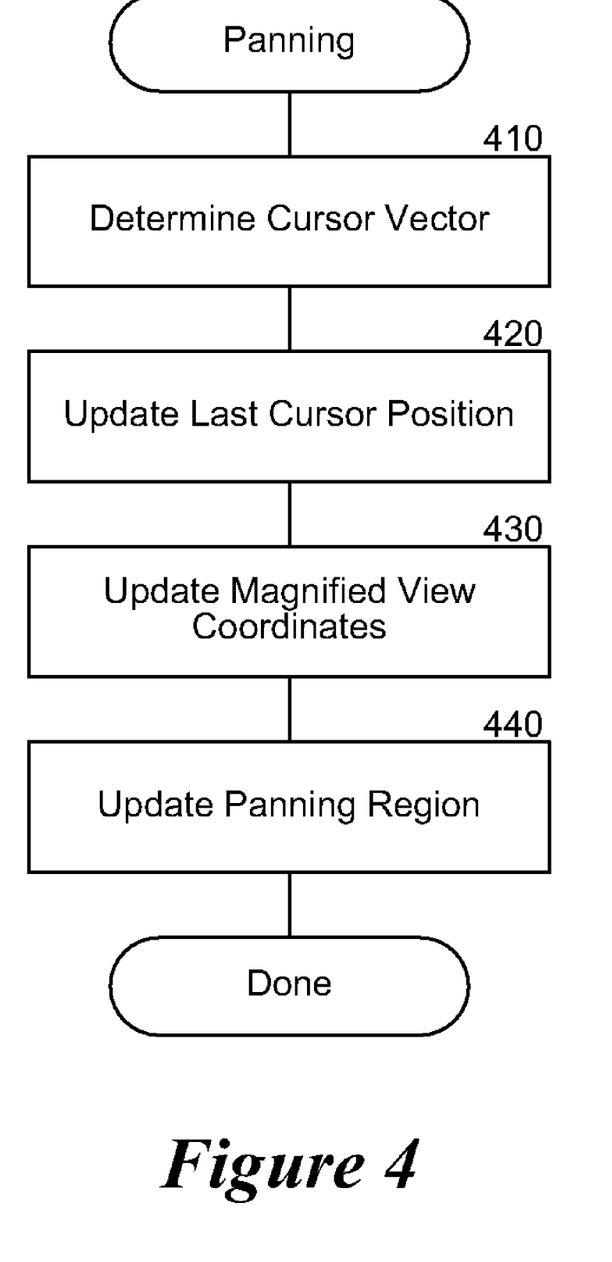
FIG. 4 is a flow diagram that illustrates the processing of the system to pan the magnified view to a new location, in one embodiment.

FIG. 4 is a flow diagram that illustrates the processing of the system to pan the magnified view to a new location, in one embodiment. The system performs these steps when the cursor is moved within the panning region. In block 410, the system determines the vector of the cursor movement. For example, the system may access the current and last positions of the cursor and determine a vector based on the two points and the time in between them. In block 420, the system stores the current cursor position for future calculations of the cursor vector. For example, the system may store a historical list of the last several positions of the cursor. In block 430, the system pans the magnified view and updates the coordinates of the screen that the magnified view will magnify and display within the view. For example, if the user moved the cursor to the lower-left in the panning region, then the system pans the magnified view to magnify a section of the screen to the lower-left of the current section. In block 440, the system updates the panning region based on the new location of the magnified view. For example, the system may enlarge or reduce the size of the panning region at a particular edge of the magnified view based on how close the area of the screen magnified by the magnified view is to the edge of the screen. The sizing of the panning region is described further herein. After block 440, these steps conclude.

In some embodiments, the magnifier panning system pans the magnified view in a direction based on the vector of cursor movement when the cursor entered the panning region. For example, if the user moves the cursor diagonally to the upper-right and enters the panning region, then the system pans the magnified view to the upper right. This is much more in line with what the user expects than previous systems and does not involve the kind of edge bumping of different edges to move the view diagonally across the screen.

Figure 5:
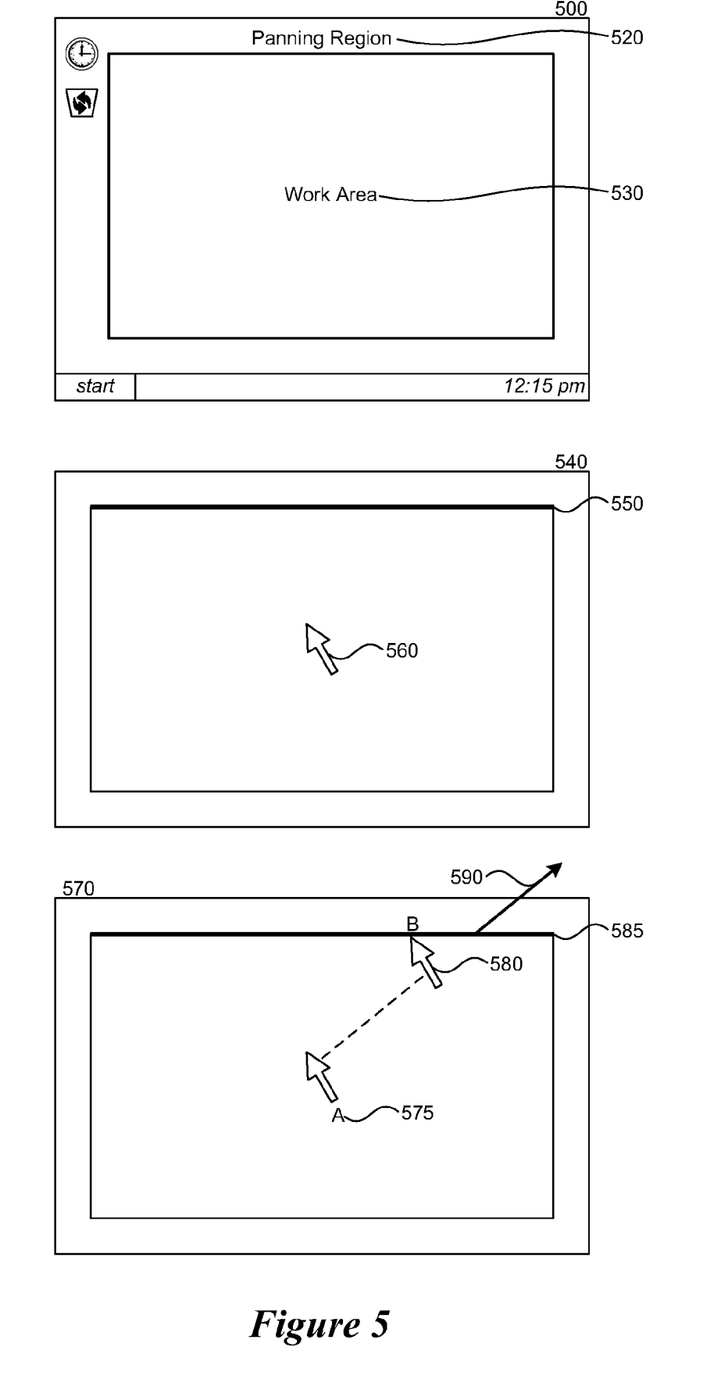
FIG. 5 is a display diagram that illustrates the interaction of the panning region with movement of the cursor, in one embodiment.

FIG. 5 is a display diagram that illustrates the interaction of the panning region with movement of the cursor, in one embodiment. FIG. 5 illustrates the magnified view in three different ways. In the first display 510, the panning region 520 is shown as an invisible border around the magnified view. The area in the middle is called the work area 530. Mouse movement within the work area 530 does not cause the magnified contents to pan. However, when the mouse cursor hits any of the boundaries between the panning region 520 and the work area 530 the system pans the magnified contents. Consider the top boundary 550 between the work area and the panning region illustrated in display 540. Panning towards the top occurs whenever the cursor 560 hits the boundary 550. The angle of the panning depends on the direction of the cursor movement. For example, in display 570, the user moves the cursor from point A 575 to point B 580 when the cursor touches the boundary 585. The vector of the movement is illustrated as vector 590, and panning occurs in the same direction as the movement vector.

In some embodiments, the magnifier panning system scales the size of the panning region based on the current distance of the magnified view from the edge of the screen. For example, when the magnified view is far from the edge of the screen (e.g., in the center of the screen), then the system uses a larger size for the panning region (e.g., 10% of the view width or height). When the magnified view is near or at the edge of the screen, then the system uses a smaller size for the panning region (e.g., 1% of the view width or height). This allows the user to quickly navigate to one edge or the other, as the system can allow faster movement when the magnified view is in the center and slow the movement down as the magnified view nears and edge.

Figure 6:
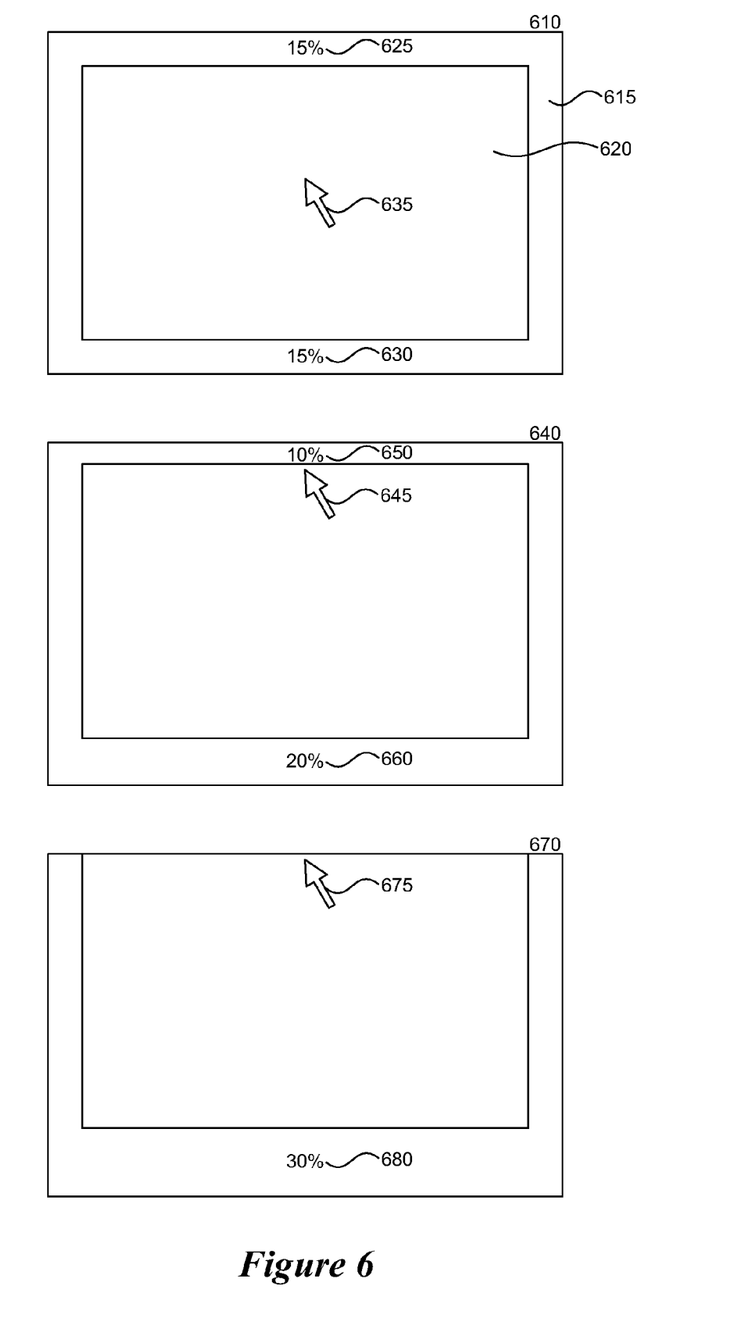
FIG. 6 is a display diagram that illustrates the changing size of the panning region, in one embodiment.

FIG. 6 is a display diagram that illustrates the changing size of the panning region, in one embodiment. Each display in FIG. 6 has a panning region 615 around the outer edge and a work area 620 in the middle. The panning region 615 has dynamic dimensions at each edge depending on the part of the screen the magnified view is currently showing. For example, in the first display 610, the magnified view is showing the center of the screen. The upper panning region 625 and the lower panning region 630 have the same size (e.g., 15% of the magnified view).while cursor 635 is at rest in the center of the work area 620. Now as the user scrolls up (e.g., by moving cursor 645 into the upper panning region 650), and there is less area to scroll up to, the upper panning region 650 illustrated in display 640 gets thinner while the lower panning region 660 gets thicker. Once the cursor 675 reaches the top of the screen, the upper panning region is reduced to zero, as illustrated in display 670 and the lower panning region 680 is largest (e.g., 30% along each dimension). Although the upper and lower panning regions are illustrated, the side panning regions work in the same way, and diagonal movement of the cursor through the panning region causes the system to adjust both the vertical and horizontal dimensions of the panning region.

Figure 7:
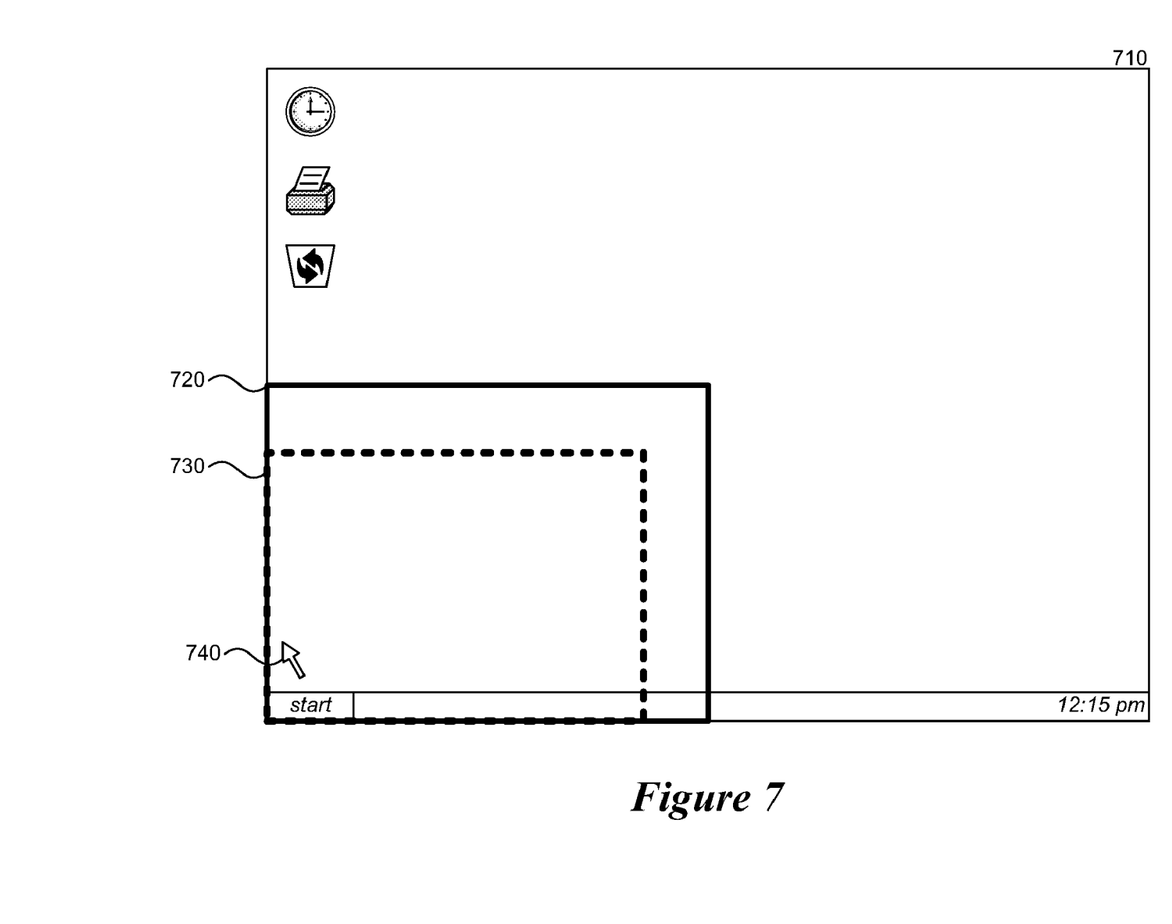
FIG. 7 is a display diagram that illustrates the size and orientation of the panning region when the magnified view is at the lower left of the screen, in one embodiment.

FIG. 7 is a display diagram that illustrates the size and orientation of the panning region when the magnified view is at the lower left of the screen, in one embodiment. The display 710 shows a user's entire desktop. When using the magnifier panning system in the full screen mode, the user only sees the magnified view 720 that takes up the whole screen. The panning region 730 is dynamic within the magnified view 720 and resizes depending on the magnified view's 720 position on the absolute desktop in the display 710. For example, if the user is zoomed into the bottom left corner of the screen, since the screen can only pan right or up, the panning region 730 exists only on the top and right regions of the screen. The user cannot actually see the panning region, but when the user moves the cursor 740 into the panning region, the system pans the magnified view 720 as described herein.

In some embodiments, to set the size of the panning region, the system receives a size of the computer desktop. Then, the system receives a location of a magnified view relative to the computer desktop. For each edge of the panning region, the system receives a default value (e.g., 15% of the magnified view size) for the size of the edge of the panning region. The system scales the received default value by an amount based on the received location of the magnified view, such that the size of the edge of the panning region gets smaller as the magnified view gets closer to the edge of the computer desktop. Once this process is completed for each edge, the system stores the panning region size and location and waits for cursor movement. When the user moves the cursor into the panning region and the system pans the magnified view, the system receives a new location of the magnified view and updates the panning region based on the new location of the magnified view.

In some embodiments, the magnifier panning system performs panning as described herein at regular intervals (e.g., throttling) to manage performance. For example, the system may determine the cursor position and pan the viewport every 10 milliseconds (ms). If the system performed panning continuously in a loop or upon every cursor movement, the performance of the system could suffer based on the frequency that is typical of cursor movements. The system may also set the interval for recalculation based on the refresh rate of the display, which provides a hint as to the frequency of screen updating expected by the user. For example, for a display operating at a 60 Hertz (Hz) refresh rate, the screen is updating every 16.7 ms. Thus, the system may select a similar interval for recalculating the location of the magnified view and the size of the panning region since there would be little benefit to the user of a more frequent interval and a potential detriment to the performance of the system. The system can use a timer or store and check the time since the last update when a relevant event occurs. The system also does not update the magnified view or the input transform unless the view changed based on panning or focus tracking.

In some embodiments, the magnifier panning system pans the magnified view when the system receives touch-based input in the panning region. Touch-based input devices, such as a digital pen, stylus, or finger, are becoming more common on devices such as Tablet PCs. If the system is used on a touch-based device, when the user touches the screen (e.g., with a finger or stylus), there is often no movement vector as there would be for mouse or more traditional cursor movement. In such cases, the system may respond to touches within the panning region by panning the magnified view. The magnitude of the panning may be determined by how far into the panning region the user touches. For example, touches farther into the panning region (i.e., closer to the edge of the magnified view) may produce larger movements than touches only a little into the panning region (i.e., further from the edge of the magnified view). The system may also shrink the size of the panning region for touch-based input to prevent misinterpretation of a touch to select an object as a user indication to pan the magnified view.

In some embodiments, the magnifier panning system animates the movement of the magnified view from one part of the screen to another when panning. For example, if input from the user (e.g., a large mouse movement or touch movement far from the current cursor position) causes the system to pan the magnified view a relatively large distance, displaying the magnified view at the new location in one move could cause the magnified view to appear to flash or jump to the new location. To create a smooth movement of the magnified view, the system may move the magnified view incrementally to the new location by displaying it in several intermediary locations first, so that the view appears to glide smoothly to the new location. This smooth movement orients the user to where the magnified view is going and provides a less unsettling experience than a jumping magnified view.

In some embodiments, when the magnifier panning system animates the movement of the magnified view the system moves the view at faster rate of speed initially (e.g., greater movements per interval) and a slower rate of speed as the view nears its final new position. This creates an acceleration and deceleration effect that informs the user that a large movement is occurring followed by the destination approaching. These visual cues can make the user more comfortable with the movement.

In some embodiments, the system provides a focus following mode in which the system pans the magnified view in response to changes in focus. For example, a user of Microsoft Windows can press the Alt+Tab key combination on the keyboard to switch the focus from one running application to another or the Win key to activate an operating system provided menu. When the focus changes, the user may be viewing a magnified area of the screen that does not contain the new item of focus. When in the focus following mode, the magnifier panning system ensures that the new item of focus is in the magnified view by panning the magnified view to a location that includes the new item of focus. As discussed herein, to avoid a large jump in position of the magnified view from its previous position to a position that includes the new item of focus, the system may animate the movement of the magnified view by moving the view in increments to the new location.

As discussed herein, the magnifier panning system may provide many options that the user can configure to alter the behavior of the system.

Figure 8:
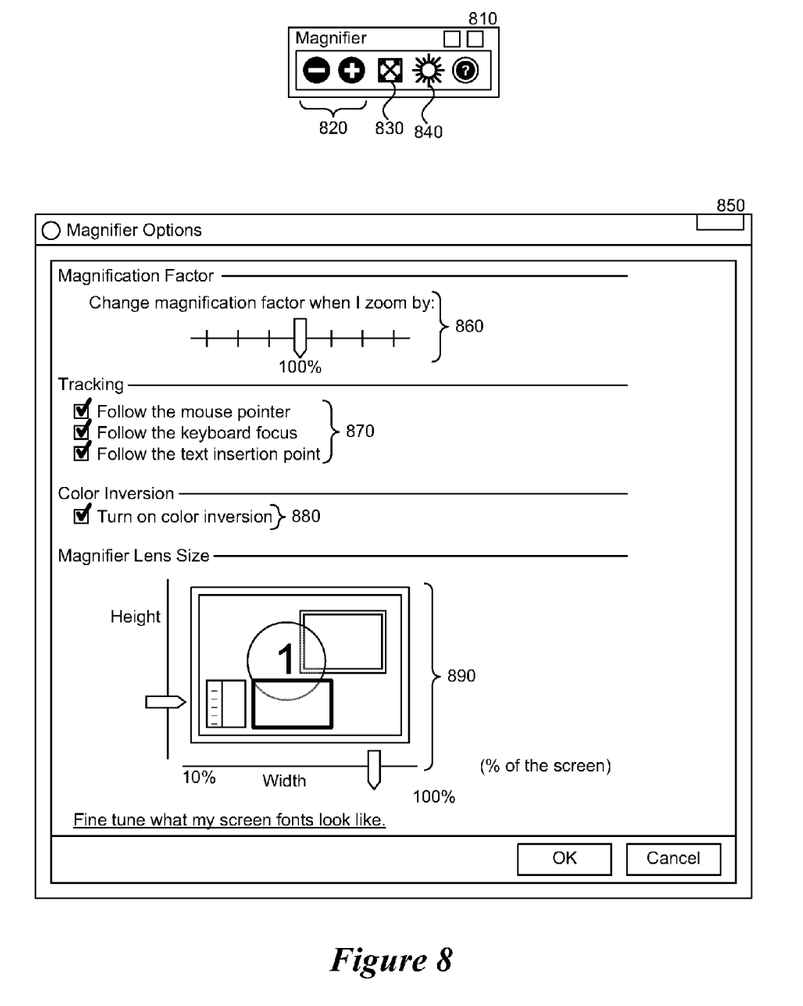
FIG. 8 is a display diagram that illustrates displays produced by the system for receiving configuration information from a user, in one embodiment.

FIG. 8 is a display diagram that illustrates displays produced by the system for receiving configuration information from a user, in one embodiment. The display 810 is a toolbar that the system may display when the system is currently magnifying a portion of the screen. The toolbar may appear only in the lens mode or in other modes as well. The toolbar contains buttons 820 for changing the magnification level (i.e., zooming in or out), a button 830 for switching between full-screen and lens mode, and an options button 840 for displaying the configuration dialog box 850. The configuration dialog box 850 contains more extensive configuration options. The configuration dialog box 850 includes a similar control 860 for changing the magnification level, as well as options 870 for changing how the magnified view behaves (e.g., focus following, cursor following), an option 880 for inverting colors (e.g., a useful visual aid for vision-impaired users), and controls 890 for setting the size of the magnified view lens.

From the foregoing, it will be appreciated that specific embodiments of the magnifier panning system have been described herein for purposes of illustration, but that various modifications may be made without deviating from the spirit and scope of the invention. For example, although screen magnifiers have been described, the system can be used for other situations where intuitive panning is beneficial, such as in videoconferencing software or video games, each of which often present a small area of a total viewable area. In addition, the system could be used in applications in place of scroll bars to scroll an area larger than the visible area. Accordingly, the invention is not limited except as by the appended claims.

We claim:

1. A computer-implemented method for panning a magnified view of a computer screen, the method comprising:
    detecting an update event that indicates a time for updating the contents and position of the view;
    retrieving a current cursor position of a displayed cursor;
    determining whether the retrieved current cursor position lies within a work area encompassing the middle of the view or in a panning region located at the outer edges of the view, wherein the panning region is invisible to a user and encompasses an area of the view in addition to the edges; and
    if the retrieved current cursor position is in the panning region, updating the view to magnify a different portion of the computer screen, such that movements of the displayed cursor outside of the panning region and within the work area do not pan the view, wherein the panning region has a dynamic size determined by a closeness of the view to each edge of the computer screen, such that when the magnified view is at the center of the computer screen, each side of the panning region is the same size based on a default value, as the magnified view gets closer to an edge of the computer screen one side of the panning region parallel to that edge of the computer screen gets smaller and an opposite side of the panning region parallel to that edge of the computer screen gets larger by scaling the default value, and when the magnified view is all the way at an edge of the computer screen there is no panning region at that edge.

2. The method of claim 1 wherein the panning region has a size that is determined at each side by a relationship between an edge of the view and an edge of the screen.

3. The method of claim 1 further comprising, updating the size and location of the panning region based on the updated view.

4. The method of claim 1 wherein updating the view comprises determining a vector of movement of the displayed cursor and moving the view based on the vector of movement.

5. The method of claim 1 further comprising initializing focus tracking and panning the view based on one or more user interface elements that have focus.

6. The method of claim 1 further comprising setting an update timer and wherein detecting an update event comprises receiving a notification that the timer has fired.

7. The method of claim 1 wherein detecting an update event throttles update events to manage the performance.

8. The method of claim 1 wherein detecting an update comprises detecting any user action that makes a displayed version of the view not match a stored version of the view.

9. The method of claim 1 wherein the panning region surrounds the view at each edge.

10. The method of claim 1 wherein the view is displayed full screen on a display such that only a portion of the computer screen is visible on the display at a time.

11. A computer system for determining when to move a magnified view produced by a computer screen magnifier, the system comprising:
    an input device configured to receive input from a user and communicate the input to an operating system;
    a cursor tracking component configured to track movement of a cursor around the screen;
    a panning region detecting component configured to detect whether the cursor is within a work area at the center of the magnified view within which movement of the cursor does not move the magnified view or within a panning region within which movement of the cursor pans the magnified view, wherein a boundary between the work area and panning region is invisible to the user and wherein the panning region has a dynamic size determined by a closeness of the view to each edge of the computer screen, such that when the magnified view is at the center of the computer screen, each side of the panning region is the same size based on a default value, as the magnified view gets closer to an edge of the computer screen one side of the panning region parallel to that edge of the computer screen gets smaller and an opposite side of the panning region parallel to that edge of the computer screen gets larger by scaling the default value, and when the magnified view is all the way at an edge of the computer screen there is no panning region at that edge;

a panning component configured to move the magnified view to a new location when the cursor is detected within the panning region;

a rendering component configured to receive input about one or more items on the screen and render a portion of the screen at a larger size in the magnified view; and a display device configured to display the contents of the magnified view.

12. The system of claim 11 wherein the input device is selected from the group consisting of a stylus, a digital pen, a mouse, and a touch screen.

13. The system of claim 11 wherein the panning component moves the magnified view based on a current and historical location of the cursor.

14. The system of claim 11 wherein the panning component moves the magnified view at an accelerated rate initially and decelerates the movement as the magnified view nears the new location.

15. The system of claim 11 wherein the rendering component receives input as a bitmap and uses a stretch blit to produce the magnified view.

16. The system of claim 11 wherein the display device displays the magnified view as a window that appears on a desktop.

17. The system of claim 11 further comprising a focus tracking component configured to track the focus of a user's actions and pan the magnified view to show an item that currently has the focus.

18. The system of claim 11 further comprising a configuration component configured to receive configuration information from the user that modifies the behavior of the system.

19. A computer-readable storage device encoded with instructions for controlling a computer system to determine the dimensions of a panning region for moving a magnified view of a computer desktop, by a method comprising:

receiving a size of the computer desktop;

receiving a location of a magnified view relative to the computer desktop, wherein the magnified view includes a work area in the middle of the magnified view and the panning region around the edges of the work area, such that movement of a cursor within the work area does not move the magnified view and movement of the cursor to the panning region pans the magnified view to a new location of the computer desktop, wherein the panning region for moving the magnified view is invisible to a user; and for at least one side of the panning region, receiving a default value for a width of the side of the panning region; and scaling the received default value by an amount based on the received location of the magnified view, wherein the panning region has a dynamic size determined by a closeness of the view to each edge of the computer desktop, such that when the magnified view is at the center of the computer desktop, each side of the panning region is the same size based on the default value, as the magnified view gets closer to an edge of the computer desktop one side of the panning region parallel to that edge of the computer desktop gets smaller and an opposite side of the panning region parallel to that edge of the computer desktop gets larger by scaling the default value, and when the magnified view is all the way at an edge of the computer desktop there is no panning region at that edge.

20. The computer-readable medium of claim 19 further comprising, receiving a new location of the magnified view and updating the panning region based on the new location of the magnified view.

* * * * *

UNITED STATES PATENT AND TRADEMARK OFFICE
CERTIFICATE OF CORRECTION

PATENT NO. : 8,074,181 B2  
APPLICATION NO. : 12/210226  
DATED : December 6, 2011  
INVENTOR(S) : Nazia Zaman et al.

Page 1 of 1

It is certified that error appears in the above-identified patent and that said Letters Patent is hereby corrected as shown below:

In column 7, line 46, delete "view)." and insert -- view), --, therefor.

Signed and Sealed this  
Thirty-first Day of January, 2012

David J. Kappos  
*Director of the United States Patent and Trademark Office*